US008677439B2

(12) United States Patent
Sun et al.

(10) Patent No.: US 8,677,439 B2
(45) Date of Patent: Mar. 18, 2014

(54) METHOD AND SYSTEM FOR REDUCING CHANNEL SWITCHING DELAY OF AN IPTV

(75) Inventors: Yurao Sun, Shenzhen (CN); Han Gao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 22 days.

(21) Appl. No.: 13/258,595

(22) PCT Filed: Aug. 9, 2010

(86) PCT No.: PCT/CN2010/075817
§ 371 (c)(1),
(2), (4) Date: Feb. 24, 2012

(87) PCT Pub. No.: WO2011/023063
PCT Pub. Date: Mar. 3, 2011

(65) Prior Publication Data
US 2012/0144440 A1    Jun. 7, 2012

(30) Foreign Application Priority Data

Aug. 25, 2009    (CN) .......................... 2009 1 0169342

(51) Int. Cl.
*H04N 7/173*    (2011.01)
(52) U.S. Cl.
USPC .............................. 725/120; 725/105; 725/34
(58) Field of Classification Search
None
See application file for complete search history.

(56) References Cited

U.S. PATENT DOCUMENTS

2007/0250890 A1*  10/2007  Joshi et al. .................... 725/120
2009/0106792 A1*  4/2009   Kan et al. ........................ 725/34

FOREIGN PATENT DOCUMENTS

| CN | 1925581 A   | 3/2007 |
| CN | 1941868 A   | 4/2007 |
| CN | 101409631 A | 4/2009 |
| CN | 101656872 A | 2/2010 |

(Continued)

OTHER PUBLICATIONS

International Search Report on international application No. PCT/CN2010/075817, mailed on Nov. 18, 2010.

(Continued)

*Primary Examiner* — Jefferey Harold
*Assistant Examiner* — Sihar Karwan
(74) *Attorney, Agent, or Firm* — Oppedahl Patent Law Firm LLC

(57) ABSTRACT

The disclosure provides a method and system for reducing channel switching delay of an IPTV. The method comprises that: an IPTV system plans a multicast association mode; the IPTV system determines, after receiving a message of requesting to access a multicast group from a terminal, other multicast groups associated with the multicast group which the terminal requests to access according to the multicast association mode and makes the terminal synchronously join in the multicast group which the terminal requests to access and other multicast groups associated with the multicast group which the terminal requests to access; provides normal multicast streams of the multicast group which the terminal requests to access, and provides no multicast streams or Low-Definition Television (LDTV) multicast streams of the other multicast groups associated with the multicast group which the terminal requests to access, and when the terminal switches channels, the IPTV system provides the terminal with normal multicast streams of the multicast group of a channel to which the terminal requests to switch when determining that the terminal has joined in the multicast group of the channel to which the terminal requests to switch. The method can reduce the channel switching delay of the IPTV and further improve the QoS of the IPTV service.

13 Claims, 2 Drawing Sheets

(56) References Cited

FOREIGN PATENT DOCUMENTS

| JP | 2003348149 A | 12/2003 |
|----|--------------|---------|
| JP | 2008263489 A | 10/2008 |
| KR | 20080081599 A | 9/2008 |

OTHER PUBLICATIONS

English Translation of the Written Opinion of the International Search Authority in international application No. PCT/CN2010/075817, mailed on Nov. 18, 2010.
Yuna Kim, Jae Keun Park, Hong Jun Choi, Sangho Lee, Heejin Park, Jong Kim, Zino Lee and Kwangil Ko, Reducing IPTV channel zapping time based on viewer's surfing behavior and preference, Proc. of IEEE Int. Symp. on Broadband Multimedia Systems and Broadcasting Mar. 2008.
Chunglae Cho et al: "Improvement of channel zapping time in IPTV services using the adjacent groups join-leave method", Advanced Communication Technology, 2004_The 6th International Conference on Phoenix Park, Korea Feb. 9-11, 2004, Piscataway, NJ, USA, IEEE, vol. 2, Feb. 9, 2004, pp. 971-975.
Yonghee Lee et al: "Reducing IPTV Channel Switching Time using H.264 Scalable Video Coding". Electrical Engineering. 2008. ICEE 2008. Second International Conference on. IEEE. Piscataway. NJ. USA. Mar. 25, 2008. pp. 1-2.
Supplementary European Search Report in European application No. 10811223.6, mailed on Sep. 20, 2013. (4 pages).

* cited by examiner

METHOD AND SYSTEM FOR REDUCING CHANNEL SWITCHING DELAY OF AN IPTV

TECHNICAL FIELD

The disclosure relates to an Internet Protocol Television (IPTV), in particular to a method and system for reducing channel switching delay of an IPTV.

BACKGROUND

The IPTV service is a general term of services which are provided to users by an IP bearing network and can support an interactive live TV program, Video on Demand (VOD), time-shifting broadcasting and other various application-based services. Due to the appearance of the IPTV, the traditional telecom operators see a new service growth point, and can integrate their advantageous network resources to explore an innovative service and an innovative commercial profit model without being limited by the provision of voice services and network bandwidths any more. In addition, the traditional Radio and Television operators can also take the IPTV as a new TV program marketing mode to sell a lot of idle program resources, so that the IPTV will provide a new opportunity for the development of the Radio and Television.

The IPTV program is generally transmitted in a multicast mode. The multicast is a network technology which allows one or more senders (multicast sources) to once send a single data packet to multiple receivers synchronously. The multicast source sends a data packet to a specific multicast group, and only an address belonging to the multicast group can receive the data packet. In the IPTV, generally, there is only one multicast source; even with a doubled number of users, the backbone bandwidth does not need to increase as any one of backbone links in the whole network only transmits a single video stream no matter how many target addresses there are, i.e., the so-called "once transmission for group broadcasting". The multicast improves the data transmission efficiency and reduces the congestion possibility of the backbone network. For an IPTV system, the number of users supported by it is only limited by the capability of an access network and has nothing to do with the pushing capability of a front-end push system.

The two key points for the multicast are selections of a multicast control point and a multicast replication point. The multicast control point completes determining on authority of a user to accept multicast data. When a user opens an IPTV service, a user management module in the IPTV system stores order information of the user; after the user selects a channel, a Set Top Box (STB) device requests to join in a multicast group corresponding to the channel by transmitting an Internet Group Message Protocol (IGMP) join request and other messages; and the multicast control point, after accepting the request, determines whether the user has the authority to watch the channel according to the order information multicast authority table of the user delivered by the user management module and can also authenticate the user by the Radius and other protocols. The multicast replication point replicates multicast streams to a port by determining whether the port has a multicast receiving request and corresponding user authority, and under the multicast replication point a live program is transmitted to the user in a unicast mode (such as Point-to-Point Protocol over Ethernet (PPPoE)), therefore the multicast replication point is more adjacent to User Equipment (UE), more network bandwidths are saved. In order to reduce the interaction complexity between the multicast replication point and the multicast control point and ensure intercommunication between the multicast replication point and the multicast control point, the multicast replication point and the multicast control point can be arranged on the same equipment. In combination with the existing condition of the Metropolitan Area Network (MAN) of the operators, the multicast replication point is generally arranged on a Digital Subscriber Line Access Multiplexer (DSLAM)/Broadband Remote Access Server (BRAS)/switch; and it is required that these devices at the network side should support the multicast, and the access network switch and other devices should support the IGMP snooping protocol, the IGMP proxy protocol and other protocols so as to implement controllable forwarding of the multicast data. A device with the multicast replication point should support a flexible Virtual Local Area Network (VLAN) function, bears different services such as the multicast, internet surfing and voice by different VLANs, and ensure a flexible Quality of Service (QoS) management capability and higher security for the system.

The main testing indexes for the IPTV service performance include a maximal pushed channel number, a average channel bandwidth, average channel switching time, I frame joining delay, average channel leaving delay, average channel joining delay, channel overlapping time and channel interval time, wherein (1) the maximal pushed channel number is the maximal number of channels which can be provided by a streaming media system, a user can traverse all the channels within a short time;

(2) the average channel bandwidth refers to the bandwidth occupied by each channel program. The bandwidth occupied by a Standard Definition Television (SDTV) program and a High Definition Television (HDTV) program are different; and the bandwidth occupied by the HDTV program is much higher than that occupied by the SDTV program;

(3) the average channel switching time refers to the time from the moment when an IGMP leaving message is transmitted to the moment when the first multicast packet of the requested channel is received;

compared with the channel switching of the IPTV which can only be implemented by the IGMP, the channel switching of traditional TV is much faster; the channel switching time of the IPTV should be generally within 2s, otherwise, the time of waiting for the channel switching is unbearable to the user; at present, how to solve the too slow channel switching of the IPTV is an urgent and main task. The IGMP is mainly processed by an access device, therefore the multicast replication and processing capability of the access terminal including the multicast switch, the multicast router, the DSLAM and other devices are important factors of affecting the channel switching time;

(4) the I frame joining delay: the successful transmission of a request for watching programs from a client does not mean that video streams have been transmitted to the receiving terminal of the user; and there are three kinds of video frames: I frames bearing information of the whole image, P frames calculated by taking the I frames or P frames as an reference, and B frames calculated by taking the I frames or P frames as an reference; only when the receiving terminal receives the I frames can indicate that the user sees the video program and the channel is really switched successfully; therefore, obtaining the I frame joining delay is more significant to the test of the channel switching time;

(5) the average channel leaving delay refers to the time from the moment when the IGMP leaving message is transmitted to the moment when the last multicast packet of the channel is received, generally, the shorter channel leaving delay is desired;

(6) the channel overlapping time refers to the time interval from the moment when the first multicast packet of the requested channel is received to the moment when the last multicast packet of the original channel is received if the method that the multicast packet of the original channel is not stopped until the multicast packet of the requested channel is received is adopted during switching of system channel;

(7) the channel interval time refers to the time interval from the moment when the last multicast packet of the original channel is received to the moment when the first multicast packet of the requested channel is received if the method that the multicast packet of the original channel is stopped prior to the receiving of the multicast packet of the requested channel during switching of system channel.

Whether the IPTV service is developed smoothly is determined by final service experience of users, which is affected by the delay in the IPTV service. Therefore, to obtain the QoS acceptable to users, the delay in the IPTV service must be as less as possible.

SUMMARY

The disclosure provides a method and system for reducing channel switching delay of an IPTV, which can reduce the delay of transmitting a program from a multicast source to a multicast replication point, and the buffering delay of an STB, and further improve the QoS of the IPTV services.

In order to solve the technical problem, the disclosure provides a method for reducing channel switching delay of an IPTV, the method comprises:

an IPTV system plans a multicast association mode to make each multicast group have a group of multicast groups associated with each multicast group itself;

the IPTV system, after receiving a message of requesting to access a multicast group from a terminal, determines according to the multicast association mode, multicast groups associated with the multicast group which the terminal requests to access and makes the terminal synchronously join in the multicast group which the terminal requests to access and the multicast groups associated with the multicast group which the terminal requests to access;

the IPTV system provides the terminal with multicast streams of the multicast group the terminal requests to access to be used as normal multicast streams, and provides the terminal with no multicast streams of the multicast groups associated with the multicast group the terminal requests to access, or provides the terminal with multicast streams of the multicast groups associated with the multicast group the terminal requests to access to be used as a part of the normal multicast streams; and when the terminal requests to switch channels, the IPTV system determines whether the terminal has joined in the multicast group of a channel to which the terminal requests to switch, if yes, the IPTV system provides the terminal with multicast streams of the multicast group of the channel to which the terminal requests to switch to be used as normal multicast streams.

In the method, the step that the IPTV system plans the multicast association mode may comprise:

the IPTV system plans the channel association mode according to a habit of users who like to switch channels by up and down navigation keys, and stipulates that, when the terminal requests to join in a multicast group of a channel, a group of multicast groups of multiple channels up and/or down the channel are all associated with the multicast group of the channel; or the IPTV system plans the channel association mode according to a habit of users who like to perform switching among channels of a same type, and stipulates that, when the terminal requests to join in a multicast group of a channel, a group of multicast groups of all other channels which are of the same type as the channel are all associated with the multicast group of the channel.

The method may further comprise:

the IPTV system, after receiving the message of requesting to access the multicast group from the terminal, authenticates authority of the terminal to access the multicast group which the terminal requests to access, if the authentication is not passed, the message is discarded; if the authentication is passed, the IPTV system determines according to the multicast association mode, multicast groups associated with the multicast group which the terminal requests to access; and the step that the IPTV system makes the terminal synchronously join in the multicast group which the terminal requests to access and the multicast groups associated with the multicast group which the terminal requests to access may comprise:

the IPTV system authenticates authority of the terminal to access the multicast groups associated with the multicast group which the terminal requests to access, and makes according to a result of authenticating, the terminal synchronously join in the multicast group which the terminal requests to access and the multicast groups which are associated with the multicast group which the terminal requests to access and have passed the authentication.

In the method, the step that the IPTV system makes the terminal synchronously join in the multicast group which the terminal requests to access and the multicast groups which are associated with the multicast group which the terminal requests to access and have passed the authentication may be as follows: the IPTV system creates a multicast forwarding table for the multicast group which the terminal requests to access and the multicast groups which are associated with the multicast group which the terminal requests to access and have passed the authentication;

the method may further comprise: the IPTV system sets marker bits for the multicast groups which are associated with the multicast group the terminal requests to access in the multicast forwarding table, and determines the marker bits of the multicast groups in the multicast forwarding table;

the method may also have the following characteristics: the IPTV system provides the terminal with multicast streams of the multicast groups having no marker bits to be used as normal multicast streams, and provide the terminal with no multicast streams of the multicast groups having marker bits, or provides the terminal with multicast streams of the multicast groups having marker bits to be used as a part of the normal multicast streams.

The method may further comprise:

the terminal sends a message of leaving a current multicast group and a message of requesting to access another multicast group to the IPTV system when switching channels;

the IPTV system, after receiving the message of leaving the current multicast group from the terminal, deletes a user port of the current multicast group from forwarding table items of the current multicast group in the multicast forwarding table according to the message; and the IPTV system, after receiving the message of requesting to access another multicast group from the terminal, searches the multicast forwarding table and determines whether the terminal has joined in the another multicast group, if yes, the IPTV system removes a marker bit of the another multicast group the terminal requests at this time from the multicast forwarding table, otherwise, the IPTV system makes the terminal synchronously join in the another multicast group and multicast groups associated with the another multicast group.

The method may further have the following characteristics:

the IPTV system provide the terminal with no multicast streams of the multicast groups having the marker bits by setting user ports of the multicast groups having marker bits in the multicast forwarding table to be empty; and the IPTV system provides the terminal with the multicast streams of the multicast groups having the marker bits to be used as a part of the normal multicast streams by setting bandwidths of the multicast groups having the marker bits in the multicast forwarding table to be Low Definition Television (LDTV); wherein bandwidth of the LDTV is 1/N of bandwidths of Standard Definition Television (SDTV) and High Definition Television (HDTV).

The disclosure further provides a system for reducing channel switching delay of an IPTV, the system comprises an association mode setting module and a multicast service module, wherein the association mode setting module is arranged to set and store a multicast association mode to make each multicast group have a group of multicast groups associated with each multicast group itself; and the multicast service module is arranged to determine, after receiving a message of requesting to access a multicast group from a terminal, multicast groups associated with the multicast group which the terminal requests to access according to the multicast association mode, make the terminal synchronously join in the multicast group which the terminal requests to access and the multicast groups associated with the multicast group which the terminal requests to access, provide the terminal with multicast streams of the multicast group which the terminal requests to access to be used as normal multicast streams, provide the terminal with no multicast streams of the multicast groups associated with the multicast group which the terminal requests to access, or provide the terminal with multicast streams of the multicast groups associated with the multicast group which the terminal requests to access to be used as a part of the normal multicast streams; and determine, when learning that the terminal requests to switch channels, whether the terminal has joined in the multicast group of a channel to which the terminal requests to switch, if yes, the multicast service module provide the terminal with multicast streams of the multicast group of the channel to which the terminal requests to switch to be used as normal multicast streams.

In the above system, the association mode setting module may be arranged to set the multicast association mode in the following way:

setting the channel association mode according to a habit of users who like to switch channels by up and down navigation keys, and stipulating that, when the terminal requests to join in a multicast group of a channel, a group of multicast groups of multiple channels up and/or down the channel are all associated with the multicast group of the channel; or planning the channel association mode according to a habit of users who like to perform switching among channels of a same type, and stipulating that, when the terminal requests to join in a multicast group of a channel, a group of multicast groups of all other channels which are of the same type as the channel are all associated with the multicast group of the channel.

The system may further comprise an authenticating module, wherein the authenticating module is arranged to authenticate, after the multicast service module receives the message of requesting to access the multicast group from the terminal, authority of the terminal to access the multicast group which the terminal requests to access and notify the multicast service module of a result of authenticating, and authenticate authority of the terminal to access multicast groups associated with the multicast group which the terminal requests to access and notify the multicast service module of a result of authenticating; and the multicast service module may be arranged to, after learning that the terminal has the authority to access the multicast group which the terminal requests to access from the authenticating module, determine according to the multicast association mode in the association mode setting module, the multicast groups associated with the multicast group which the terminal requests to access, and make the terminal synchronously join in the multicast group which the terminal requests to access and the multicast groups associated with the multicast group which the terminal requests to access in the following ways: acquiring the authority of the terminal to access the multicast groups associated with the multicast group which the terminal requests to access from the authenticating module, and making the terminal synchronously join in the multicast group which the terminal requests to access and the multicast groups which are associated with the multicast group which the terminal requests to access and have passed the authentication.

The system may further have the following characteristics:

the multicast service module is arranged to make the terminal synchronously join in the multicast group which the terminal requests to access and the multicast groups which are associated with the multicast group which the terminal requests to access and have passed the authentication, by creating a multicast forwarding table for the multicast group which the terminal requests to access and the multicast groups which are associated with the multicast group which the terminal requests to access and have passed the authentication; and the multicast service module is further arranged to set marker bits for the multicast groups associated with the multicast group which the terminal requests to access in the multicast forwarding table, and determine the marker bits of the multicast groups in the multicast forwarding table; and the multicast service module is further arranged to provide the terminal with multicast streams of the multicast groups having no marker bits to be used as normal multicast streams, and provide the terminal with no multicast streams of the multicast groups having the marker bits, or provide the terminal with multicast streams of the multicast groups having the marker bits to be used as a part of the normal multicast streams.

In the above system, the multicast service module may be further arranged to delete, after receiving a message of leaving a current multicast group from the terminal, a user port of the current multicast group from forwarding table items of the current multicast group in the multicast forwarding table according to the message; and search the multicast forwarding table after receiving a message of requesting to access another multicast group from the terminal, and determine whether the terminal has joined in the another multicast group, if yes, removes a marker bit of the another multicast group which the terminal requests at this time from the multicast forwarding table, otherwise, makes the terminal synchronously join in the another multicast group and multicast groups associated with the another multicast group.

The system may further have the following characteristics:

the multicast service module is arranged to provide the terminal with no multicast streams of multicast groups having marker bits by setting user ports of the multicast groups having the marker bits in the multicast forwarding table to be empty; and provide the terminal with multicast streams of the multicast groups having the marker bits to be used as a part of normal multicast streams by setting bandwidths of the multicast groups having the marker bits in the multicast forwarding table to be LDTV; wherein bandwidth of the LDTV is 1/N of bandwidths of SDTV and HDTV.

The system may further have the following characteristics: the multicast service module is further arranged to update, after operating the multicast forwarding table, a user table for storing association relationship between the multicast groups and the user according to the multicast forwarding table.

The disclosure provides a method and system for reducing channel switching delay of an IPTV, which reduces the delay of transmitting a program from a multicast source to a multicast replication point, and reduces the buffering delay of an STB and further improves the QoS of the IPTV service.

DETAILED DESCRIPTION

Embodiments of the disclosure are described below with reference to the drawings in detail.

Figure 1:
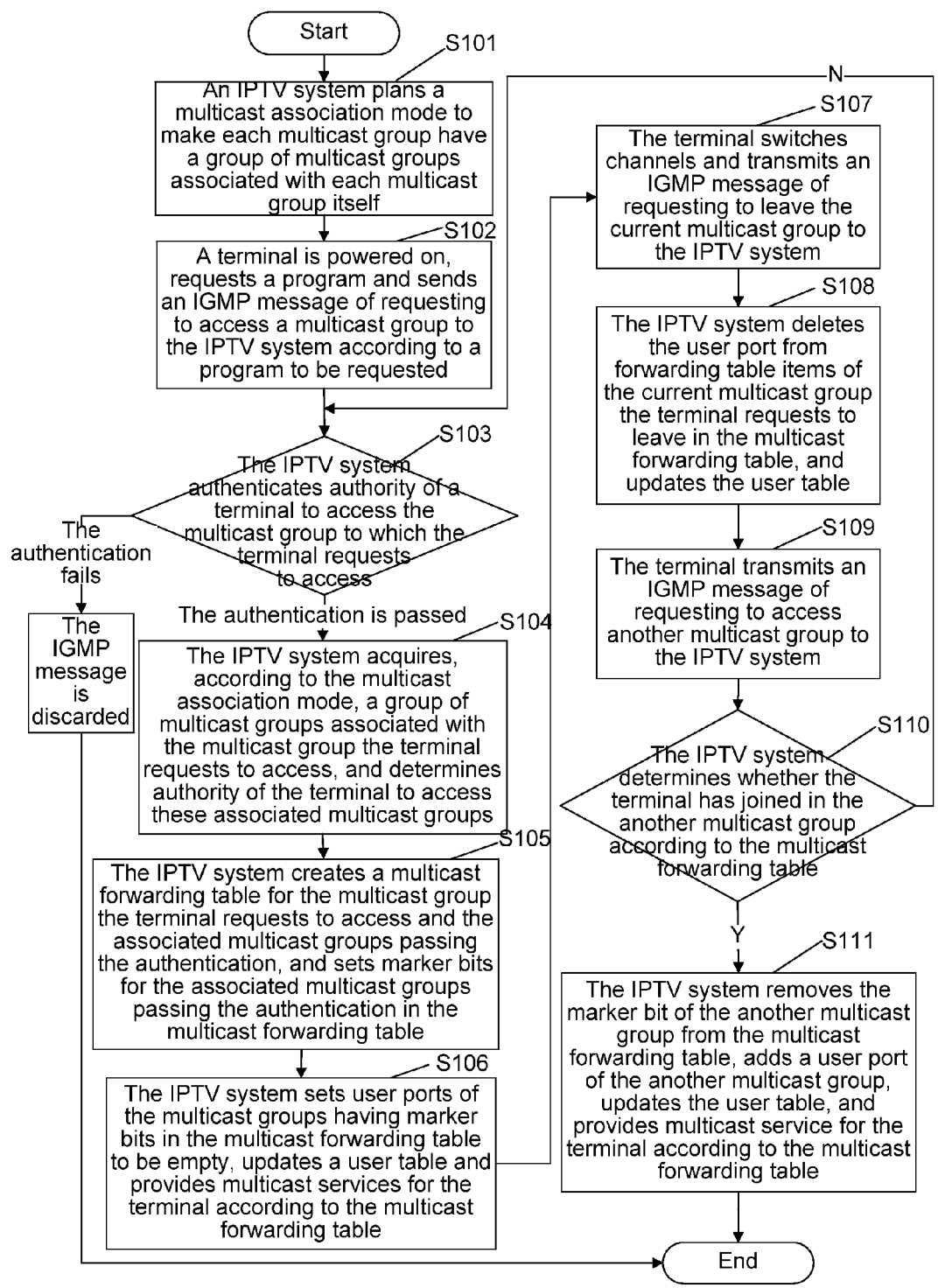
FIG. 1 is a flow chart of a method for reducing channel switching delay of an IPTV according to an embodiment of the disclosure.

Refer to FIG. 1, which shows a method for reducing channel switching delay of an IPTV according to an embodiment of the disclosure The method comprises the following steps.

Step S101: an IPTV system plans a multicast association mode to make each multicast group have a group of multicast groups associated with each multicast group itself.

This applicant perceptively noted that common users always have some habits when switching programs by the IPTV, for example, they like to switch channels by up and down navigation keys, or like to watch channels of the same type and like to perform switching among channels of the same type, etc., therefore, the disclosure provides a planning solution for associating multicast groups according to the habits of the users so as to provide an effective method for reducing switching delay in the subsequent steps on this basis.

The planning of the multicast association mode according to the habits of users can be specifically as follows:

when the multicast association mode is planned according to a habit of users who like to switch channels by the up and down navigation keys, it can be stipulated that, when a user requests a multicast group of channel N, a group of multicast groups of M1 channels up the channel N and/or M2 channels down the channel N are all associated with the multicast group of the channel N, wherein the values of M1 and M2 can be set as required and are not limited here;

when the multicast association mode is planned according to a habit of users who like to perform switching among channels of the same type, it can be stipulated that, when a user requests a multicast group of channel N, a group of multicast groups of all other channels which are of the same type as the channel N are all associated with the multicast group of the channel N; types of the channels can be classified according to contents, for example, the channels can be classified into sport channels, entertainment channels, film channels, music channels, life channels, game channels, reading channels, travel channels, TV play channels, news channels, international channels, comprehensive channels and the like; the channels can either be classified according to territories, for example, the channels can be classified into China Central Television (CCTV), Hunan TV, Tianjin TV and the like; and a specific channel classification mode can be set as required and is not limited here.

The above mentioned habits are common channel switching habits of users at present; of course, there may be also other channel switching habits, and the embodiments of the disclosure are not limited to plan the multicast association mode according to the above mentioned channel switching habits. Preferably, the IPTV system in the embodiments of the disclosure can plan the multicast association mode as required, for example, a common channel switching habit of most of clients or a common channel switching habit of clients having large consumption is selected as the habit of users of the IPTV system for planning the multicast association mode.

Step S102: a terminal is powered on, requests a program and sends an IGMP message of requesting to access a multicast group to the IPTV system according to a program to be requested.

Step S103: the IPTV system, after receiving the IGMP message of requesting to access the multicast group from the terminal, parses the message and authenticates authority of the terminal to access the multicast group which the terminal requests to access; if the authentication is passed, step S104 is executed, otherwise, the IGMP message is discarded and the process is ended.

The IPTV system, after receiving the IGMP message from the terminal, parses the message, extracts the mac, port, and vlan of the user and an multicast address from the IGMP message, searches a Channel Access Control (CAC) module of the IPTV system to authenticates the terminal.

The CAC module functions in realizing that, according to preset authority of a user to access multicast channels, the user can watch some bought channels without limitation, can preview some channels, but is refused to access the rest; in addition, the CAC module can also designate a source port of a multicast group, i.e., multicast streams must inflow from the source port, and control a query message of a multicast group, if the matched rule have no authority to process the query message, the query message is discarded.

The CAC module mainly has two tables: a channel access control rule table and a channel table; wherein the channel access control rule table is used for controlling authority of a user to access a multicast channel, thus, when a user applies for a channel, the authority table is matched, then the required operation of the user is executed according to the matched authority of the user.

If the CAC module determines that the user is one who orders a multicast group, the order authority of the user to the multicast group and the number of a Multicast VLAN (MVLAN) to which the multicast group belongs are returned; if the CAC module determines that the user is one who is permitted to preview a multicast group, and the previewing times of the user is less than the maximal previewing times and the interval between the present previewing and the last previewing is more than a predetermined previewing interval, the preview authority of the user to the multicast group and the number of a MVLAN to which the multicast group belongs are returned; otherwise, it is returned that the user has no authority to access the multicast group.

Step S104: the IPTV system acquires, according to the multicast association mode, a group of multicast groups associated with the multicast group the terminal requests to access, and determines authority of the terminal to access these associated multicast groups.

In this step, the method for authenticating the authority of the terminal to access these associated multicast groups by the IPTV system is the same as that in step S103, which is not repeated here.

Step S105: the IPTV system creates a multicast forwarding table for the multicast group the terminal requests to access and the associated multicast groups passing the authentication, and sets marker bits for the associated multicast groups passing the authentication in the multicast forwarding table.

The IPTV system sets the multicast forwarding table according to an MVLAN, a user port and a VLAN of the multicast group; if the MVLAN and the user VLAN are not the same VLAN, a three-layer multicast forwarding table is set to cross the VLAN; and if the MVLAN and the user VLAN are the same VLAN, a two-layer multicast forwarding table is set.

Step S106: the IPTV system sets user ports of the multicast groups having marker bits in the multicast forwarding table (i.e., the multicast groups which are associated with the multicast group the terminal requests to access and have passed the authentication) to be empty, upgrades a user table according to the setting of the multicast forwarding table and then provides multicast services for the terminal according to the multicast forwarding table.

The user ports of the multicast groups in the multicast forwarding table are outflow ports for the multicast streams of the multicast groups. In an embodiment of the disclosure, the user ports of the multicast groups associated with the multicast group the terminal requests to access are set to be empty, in this way, although the associated multicast groups have been added in the multicast forwarding table, the multicast streams are actually not transmitted and no bandwidth is occupied, the multicast streams are only transmitted for the multicast group the terminal really requests, therefore, the watching effect of the user will not be affected.

The user table is used for storing the association relationship between the multicast groups and the user, and needs to be updated when the multicast forwarding table changes.

In another embodiment, this step can also be as follows: the IPTV system sets bandwidths of the multicast groups having marker bits in the multicast forwarding table (i.e., the multicast groups which are associated with the multicast group the terminal requests to access and have passed the authentication) to be Low Definition Television (LDTV) bandwidths, updates the user table according to the setting of the multicast forwarding table, and then provides multicast services for the terminal according to the multicast forwarding table. Bandwidth of the so-called LDTV is 1/N of the bandwidths of the SDTV and HDTV programs, wherein N can be customized according to a specific condition of the network. The LDTV program is not for watching, but for synchronously transmitting and storing some channel multicast streams while a user requests a channel so as to reduce the channel switching time; and the LDTV program occupies few bandwidths, therefore the service of delivering the multicast streams for the multicast group the user really requests will not be affected.

Step S107: the terminal perform an operation of channel switching and transmits to the IPTV system an IGMP message of requesting to leave the current multicast group.

Step S108: the IPTV system, after receiving the IGMP message of requesting to leave the current multicast group from the terminal, deletes the user port from forwarding table items of the current multicast group the terminal requests to leave in the multicast forwarding table according to the message, and upgrades the user table.

The IPTV system, after receiving the IGMP message of requesting to leave the current multicast group from the terminal, parses the message, extracts the multicast group address and the port, vlan, mac, ip parameters of the user in the message and transmits them to the CAC module; the CAC module searches the user table; if the user exists, the number of the MVLAN to which the multicast group belongs is returned so as to delete the user port from the forwarding table items of the multicast group; otherwise, the message is discarded. The IPTV system will give the CAC module an acknowledgement after successfully deleting the user port from the multicast forwarding table, and the CAC module will delete the user from the user table.

The range of the multicast groups is added by a multicast replication point device, so the user will only transmit a leaving message of a multicast group being requested and will not transmit leaving messages of other multicast groups in the range of the multicast groups, therefore the disclosure has no influence on the leaving of the multicast group.

When a user does not transmit an IGMP message of requesting to leave the current multicast group after the minimal valid time, the CAC module generates an online record of the user; if the user is a previewing user, the previewing times of the rule to which the user belongs is plus 1; if the user transmits an IGMP message of requesting to leave the current multicast group after the minimal valid time, the CAC module generates an offline record of the user.

When deleting the user port from the forwarding table items of the current multicast group in the multicast forwarding table, the IPTV system may also determine whether the current multicast group has other multicast users; if there is no other multicast users of the multicast group, the IPTV system deletes the multicast group, otherwise, only deletes the user port in the forwarding table items.

Step S109: the terminal transmits to the IPTV system an IGMP message of requesting to access another multicast group For the IPTV system, there is no conflict between the processes of joining in a multicast group and leaving a multicast group, as a result, the terminal can synchronously transmit a message of leaving a multicast group and a message of joining in a multicast group according to a specific implementation way of the terminal when performing channel switching, or it is possible that a message of leaving a multicast group is transmitted prior to the transmission of a message of joining in a multicast group, i.e., steps S109 and S107 can be executed synchronously.

Step S110: the IPTV system, after receiving the IGMP message of requesting to access another multicast group from the terminal, parses the message and determines in the multicast forwarding table whether the terminal has joined in the another multicast group the terminal requests to access at this time according to the parsed multicast address of the another multicast group; if yes, step S111 is executed, otherwise, step S103 is executed.

The IPTV system, after receiving the IGMP message from a user, parses the message, and can acquire the mac, port and vlan of the user and the multicast address.

Step S111: the IPTV system removes the marker bit of the another multicast group the terminal requests to access at this time from the multicast forwarding table, adds a user port of another multicast group, updates the user table according to the setting of the multicast forwarding table, and then provides multicast services for the terminal according to the multicast forwarding table; and the process is ended.

Since the disclosure puts forward a concept of associated multicast groups, both a multicast group a user requests to access and a group of multicast groups associated with the multicast group the user requests to access are joined in when a terminal is powered on for requesting a program according to the habits of users; besides, the delivering of service of the multicast group the user requests will not be affected by setting the multicast forwarding table corresponding and delivering no or rare services for these associated multicast groups; and when the user switches channels, fast channel switching can be realized only by setting the service of the multicast group of the channel to which the user switches to be normal, as the user has joined in the associated multicast groups.

For the solution of processing and limiting the bandwidths of the multicast streams by the QoS in step S106, a corresponding solution in step S111, i.e., when the terminal switches channels, can be as follows: the IPTV system removes the marker bit of the multicast group the terminal requests at this time from the multicast forwarding table, restores the bandwidth of the multicast streams of the multicast group, i.e., setting the bandwidth of the multicast streams of the multicast group as SDTV or HDTV, updates the user table according to the setting of the multicast forwarding table, and then provides multicast services for the terminal according to the multicast forwarding table; and the process is ended.

Figure 2:
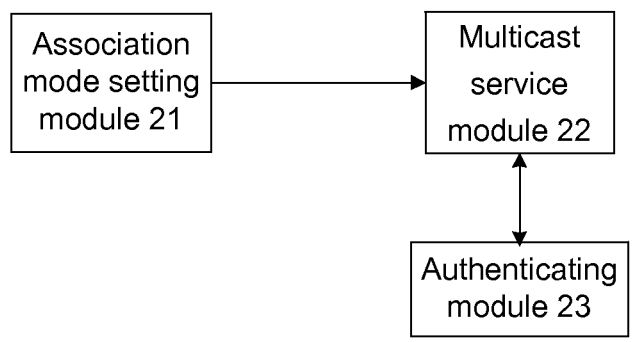
FIG. 2 is a block diagram of a system for reducing channel switching delay of an IPTV according to an embodiment of the disclosure.

In order to implement the above method, the disclosure further provides a system for reducing channel switching delay of an IPTV. As shown in FIG. 2, the system comprises an association mode setting module 21, a multicast service module 22, and an authenticating module 23, wherein the modules are arranged as follows.

The association mode setting module 21 is arranged to set and store a multicast association mode to make each multicast group have a group of multicast groups associated with each multicast group itself.

The association mode setting module 21 is arranged to set a multicast association mode according to a habit of users; for example, the channel association mode is set according to a habit of users who like to switch channels by up and down navigation keys, and it is stipulated that, when a terminal requests to join in a multicast group of a channel, a group of multicast groups of multiple channels up and/or down the channel are all associated with the multicast group of the channel; or the channel association mode is planned according to a habit of users who like to perform switching among channels of the same type, and it is stipulated that, when a terminal requests to join in a multicast group of a channel, a group of multicast groups of all other channels which are of the same type as the channel are all associated with the multicast group of the channel. Of course, the multicast association mode can also be set according to other requirements, and is not limited in the disclosure.

The multicast service module 22 is arranged to, after receiving a message of requesting to access a multicast group from a terminal, determine, according to the multicast association mode, other multicast groups associated with the multicast group which the terminal requests to access, make the terminal synchronously join in the multicast group which the terminal requests to access and the other multicast groups associated the multicast group which the terminal requests to access, provide normal multicast streams of the multicast group the terminal requests to access, and provide no multicast streams of the other multicast groups associated with the multicast group the terminal requests to access, or provide multicast streams of the other multicast groups associated with the multicast group the terminal requests to access to be used as a part of the normal multicast streams; and multicast service module 22 is arranged to determine whether the terminal has joined the multicast group of the channel to which the terminal requests to switch when learning that the terminal performs switching of channels, if yes, provide the terminal with normal multicast streams of the multicast group of the channel to which the terminal requests to switch.

The authenticating module 23 is arranged to, after the multicast service module 22 receives a message of requesting to access a multicast group from the terminal, authenticate the authority of the terminal to access the multicast group which the terminal requests to access and notify the multicast service module 22 of the authentication result, and authenticate the authority of the terminal to access other multicast groups which are determined by the multicast service module 22 and associated with the multicast group which the terminal requests to access, and notify the multicast service module 22 of the authentication result.

Furthermore, the multicast service module 22 is arranged to, after learning from the authenticating module 23 that the terminal has the authority to access the multicast group which the terminal requests to access, determine, according to the multicast association mode in the association mode setting module 21, the other multicast groups associated with the multicast group which the terminal requests to access; and then make the terminal join in both the multicast group which the terminal requests to access and the multicast groups which are associated with the multicast group which the terminal requests to access and have passed the authentication after acquiring from the authenticating module 23 the authority of the terminal to access the other multicast groups associated with the multicast group which the terminal requests to access.

Furthermore, the multicast service module 22 is arranged to make the terminal synchronously join in the multicast group which the terminal requests to access and the multicast groups which are associated with the multicast group which the terminal requests to access and have passed the authentication, by creating a multicast forwarding table for the multicast group which the terminal requests to access and the multicast groups which are associated with the multicast group which the terminal requests to access and have passed the authentication.

Furthermore, the multicast service module 22 is arranged to set marker bits for the multicast groups associated with the multicast group the terminal requests to access in the multicast forwarding table, determine the marker bits of the multicast groups in the multicast forwarding table; the multicast service module 22 is further arranged to provide the terminal with normal multicast streams of the multicast group which has no marker bits, and provide the terminal with no multicast streams of the multicast groups having the marker bits, or provide the terminal with multicast streams of the multicast groups having the marker bits to be used as a part of the normal multicast streams.

Furthermore, the multicast service module 22 is arranged to, after receiving a message of leaving the current multicast group from the terminal, delete the user port from the forwarding table items of the current multicast group in the multicast forwarding table according to the message; and arranged to, after receiving a message of requesting to access another multicast group from the terminal, search the multicast forwarding table and determine whether the terminal has joined in the another multicast group, if yes, remove the marker bit of the another multicast group the terminal requests at this time from the multicast forwarding table, otherwise, make the terminal synchronously join in the another multicast group and multicast groups associated with the another multicast group.

Furthermore, the multicast service module 22 is arranged to provide the terminal with no multicast streams of the multicast groups having the marker bits by setting the user ports of the multicast groups having marker bits in the multicast forwarding table to be empty; and arranged to provide the terminal with the multicast streams of the multicast groups having the marker bits to be used as a part of the normal multicast streams by setting the bandwidths of the multicast groups having the marker bits in the multicast forwarding table to be LDTV, wherein the bandwidth of the LDTV is 1/N of the bandwidths of the SDTV and HDTV programs.

Furthermore, the multicast service module 22 is arranged to, after operating the multicast forwarding table, update the user table for storing the association relationship between the multicast groups and the user according to the multicast forwarding table.

The disclosure also has various other embodiments, and various corresponding changes and modifications may be made by those skilled in the art within the spirit and essence of the disclosure, but those changes and modifications shall belong to the protection scope of the claims appended in the disclosure.

INDUSTRIAL APPLICABILITY

The method and system of the disclosure can reduce the delay of transmitting a program from a multicast source to a multicast replication point, and reduce the buffering delay of an STB, and further improve the QoS of the IPTV services compared with the prior art.

The invention claimed is:

1. A method for reducing channel switching delay of an Internet Protocol Television (IPTV), comprising:
    planning, by an IPTV system, a multicast association mode to make each multicast group have a group of multicast groups associated with each multicast group itself;
    determining, by the IPTV system, multicast groups associated with a multicast group which a terminal requests to access according to the multicast association mode after receiving a message of requesting to access the multicast group from the terminal, and making the terminal synchronously join in the multicast group which the terminal requests to access and the multicast groups associated with the multicast group which the terminal requests to access;
    providing, by the IPTV system, the terminal with multicast streams of the multicast group the terminal requests to access to be used as normal multicast streams, and providing the terminal with no multicast streams of the multicast groups associated with the multicast group the terminal requests to access, or providing the terminal with multicast streams of the multicast groups associated with the multicast group the terminal requests to access to be used as a part of the normal multicast streams; and
    determining, by the IPTV system, whether the terminal has joined in the multicast group of a channel to which the terminal requests to switch when the terminal requests to switch channel, if yes, providing the terminal with multicast streams of the multicast group of the channel to which the terminal requests to switch to be used as normal multicast streams.

2. The method according to claim 1, wherein
the step of planning the multicast association mode by the IPTV system comprises:
    planning, by the IPTV system, the channel association mode according to a habit of users who like to switch channels by up and down navigation keys, and stipulating that, when the terminal requests to join in a multicast group of a channel, a group of multicast groups of multiple channels up and/or down the channel are all associated with the multicast group of the channel; or
    planning, by the IPTV system, the channel association mode according to a habit of users who like to perform switching among channels of a same type, and stipulating that, when the terminal requests to join in a multicast group of a channel, a group of multicast groups of all other channels which are of the same type as the channel are all associated with the multicast group of the channel.

3. The method according to claim 2, wherein,
authenticating, by the IPTV system, authority of the terminal to access the multicast group which the terminal requests to access after receiving the message of requesting to access the multicast group from the terminal, if the authentication is not passed, discarding the message; if the authentication is passed, determining multicast groups associated with the multicast group which the terminal requests to access according to the multicast association mode; and
the step of making the terminal synchronously join in the multicast group which the terminal requests to access and the multicast groups associated with the multicast group which the terminal requests to access comprises:
authenticating, by the IPTV system, authority of the terminal to access the multicast groups associated with the multicast group which the terminal requests to access, and making according to a result of authenticating, the terminal synchronously join in the multicast group which the terminal requests to access and the multicast groups which are associated with the multicast group which the terminal requests to access and have passed the authentication.

4. The method according to claim 3, wherein
the step of making the terminal synchronously join in the multicast group which the terminal requests to access and the multicast groups which are associated with the multicast group which the terminal requests to access and have passed the authentication according to the result of authenticating is as follows: creating, by the IPTV system, a multicast forwarding table for the multicast group which the terminal requests to access and the multicast groups which are associated with the multicast group which the terminal requests to access and have passed the authentication;
the method further comprises: setting, by the IPTV system, marker bits for the multicast groups which are associated with the multicast group the terminal requests to access in the multicast forwarding table, and determining the marker bits of the multicast groups in the multicast forwarding table;
in the step of providing, by the IPTV system, the terminal with the multicast streams of the multicast group the terminal requests to access to be used as the normal multicast streams, providing, by the IPTV system, the terminal with multicast streams of the multicast groups having no marker bits to be used as normal multicast streams;

in the step of providing, by the IPTV system, the terminal with no multicast streams of the multicast groups associated with the multicast group the terminal requests to access, providing, by the IPTV system, the terminal with no multicast streams of the multicast groups having marker bits; and in the step of providing, by the IPTV system, the terminal with the multicast streams of the multicast groups associated with the multicast group the terminal requests to access to be used as a part of the normal multicast streams, providing, by the IPTV system, the terminal with multicast streams of the multicast groups having marker bits to be used as a part of the normal multicast streams.

5. The method according to claim 4, further comprising:
sending, by the terminal, a message of leaving a current multicast group and a message of requesting to access another multicast group to the IPTV system when switching channels;

deleting, by the IPTV system, a user port of the current multicast group from forwarding table items of the current multicast group in the multicast forwarding table according to the received message after receiving the message of leaving the current multicast group from the terminal; and searching, by the IPTV system, the multicast forwarding table after receiving the message of requesting to access another multicast group from the terminal, and determining whether the terminal has joined in the another multicast group, if yes, removing a marker bit of the another multicast group the terminal requests at this time from the multicast forwarding table, otherwise, making the terminal synchronously join in the another multicast group and multicast groups associated with the another multicast group.

6. The method according to claim 5, wherein
in the step of providing, by the IPTV system, the terminal with no multicast streams of the multicast groups having the marker bits, providing, by the IPTV system, the terminal with no multicast streams of the multicast groups having the marker bits by setting user ports of the multicast groups having marker bits in the multicast forwarding table to be empty; and in the step of providing, by the IPTV system, the terminal with the multicast streams of the multicast groups having the marker bits to be used as a part of normal multicast streams, providing, by the IPTV system, the terminal with the multicast streams of the multicast groups having the marker bits to be used as a part of the normal multicast streams by setting bandwidths of the multicast groups having the marker bits in the multicast forwarding table to be Low Definition Television (LDTV); wherein bandwidth of the LDTV is 1/N of bandwidths of Standard Definition Television (SDTV) and High Definition Television (HDTV).

7. A system for reducing channel switching delay of an IPTV, comprising: an association mode setting module and a multicast service module, wherein the association mode setting module is arranged to set and store a multicast association mode to make each multicast group have a group of multicast groups associated with each multicast group itself; and the multicast service module is arranged to determine, after receiving a message of requesting to access a multicast group from a terminal, multicast groups associated with the multicast group which the terminal requests to access according to the multicast association mode, make the terminal synchronously join in the multicast group which the terminal requests to access and the multicast groups associated with the multicast group which the terminal requests to access, provide the terminal with multicast streams of the multicast group which the terminal requests to access to be used as normal multicast streams, provide the terminal with no multicast streams of the multicast groups associated with the multicast group which the terminal requests to access, or provide the terminal with multicast streams of the multicast groups associated with the multicast group which the terminal requests to access to be used as a part of the normal multicast streams; and determine, when learning that the terminal requests to switch channels, whether the terminal has joined in the multicast group of a channel to which the terminal requests to switch, if yes, provide the terminal with multicast streams of the multicast group of the channel to which the terminal requests to switch to be used as normal multicast streams.

8. The system according to claim 7, wherein
the association mode setting module is arranged to set the multicast association mode in the following way:

setting the channel association mode according to a habit of users who like to switch channels by up and down navigation keys, and stipulating that, when the terminal requests to join in a multicast group of a channel, a group of multicast groups of multiple channels up and/or down the channel are all associated with the multicast group of the channel; or planning the channel association mode according to a habit of users who like to perform switching among channels of a same type, and stipulating that, when the terminal requests to join in a multicast group of a channel, a group of multicast groups of all other channels which are of the same type as the channel are all associated with the multicast group of the channel.

9. The system according to claim 8, further comprising an authenticating module, wherein the authenticating module is arranged to authenticate, after the multicast service module receives the message of requesting to access the multicast group from the terminal, authority of the terminal to access the multicast group which the terminal requests to access and notify the multicast service module of a result of authenticating, and authenticate authority of the terminal to access multicast groups associated with the multicast group which the terminal requests to access and notify the multicast service module of a result of authenticating; and the multicast service module is arranged to, after learning that the terminal has the authority to access the multicast group which the terminal requests to access from the authenticating module, determine according to the multicast association mode in the association mode setting module, the multicast groups associated with the multicast group which the terminal requests to access, and make the terminal synchronously join in the multicast group which the terminal requests to access and the multicast groups associated with the multicast group which the terminal requests to access in the following ways: acquiring the authority of the terminal to access the multicast groups associated with the multicast group which the terminal requests to access from the authenticating module, and making the terminal synchronously join in the multicast group which the terminal requests to access and the multicast groups which are associated with the multicast group which the terminal requests to access and have passed the authentication.

10. The system according to claim 9, wherein
the multicast service module is arranged to make the terminal synchronously join in the multicast group which the terminal requests to access and the multicast groups which are associated with the multicast group which the terminal requests to access and have passed the authentication, by creating a multicast forwarding table for the multicast group which the terminal requests to access and the multicast groups which are associated with the multicast group which the terminal requests to access and have passed the authentication; and the multicast service module is further arranged to set marker bits for the multicast groups associated with the multicast group which the terminal requests to access in the multicast forwarding table, and determine the marker bits of the multicast groups in the multicast forwarding table; and the multicast service module is further arranged to provide the terminal with multicast streams of the multicast groups having no marker bits to be used as normal multicast streams, and provide the terminal with no multicast streams of the multicast groups having the marker bits, or provide the terminal with multicast streams of the multicast groups having the marker bits to be used as a part of the normal multicast streams.

11. The system according to claim 10, wherein
the multicast service module is further arranged to delete, after receiving a message of leaving a current multicast group from the terminal, a user port of the current multicast group from forwarding table items of the current multicast group in the multicast forwarding table according to the received message; and search the multicast forwarding table after receiving a message of requesting to access another multicast group from the terminal, and determine whether the terminal has joined in the another multicast group, if yes, removes a marker bit of the another multicast group which the terminal requests at this time from the multicast forwarding table, otherwise, makes the terminal synchronously join in the another multicast group and multicast groups associated with the another multicast group.

12. The system according to claim 11, wherein
the multicast service module is arranged to provide the terminal with no multicast streams of multicast groups having marker bits by setting user ports of the multicast groups having the marker bits in the multicast forwarding table to be empty; and provide the terminal with multicast streams of the multicast groups having the marker bits to be used as a part of normal multicast streams by setting bandwidths of the multicast groups having the marker bits in the multicast forwarding table to be LDTV; wherein bandwidth of the LDTV is 1/N of bandwidths of SDTV and HDTV.

13. The system according to claim 12, wherein
the multicast service module is further arranged to update, after operating the multicast forwarding table, a user table for storing association relationship between the multicast groups and the user according to the multicast forwarding table.

\* \* \* \* \*

UNITED STATES PATENT AND TRADEMARK OFFICE
CERTIFICATE OF CORRECTION

PATENT NO.         : 8,677,439 B2             Page 1 of 1
APPLICATION NO.    : 13/258595
DATED              : March 18, 2014
INVENTOR(S)        : Sun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 36 days.

Signed and Sealed this
Twenty-ninth Day of September, 2015

Michelle K. Lee
*Director of the United States Patent and Trademark Office*